(12) United States Patent
Peng et al.

(10) Patent No.: US 11,204,985 B2
(45) Date of Patent: Dec. 21, 2021

(54) SYSTEMS, METHODS, AND STORAGE MEDIA FOR CREATING SECURED COMPUTER CODE HAVING ENTANGLED TRANSFORMATIONS

(71) Applicant: IRDETO B.V., Hoofddorp (NL)

(72) Inventors: Damon Peng, Ottawa (CA); Grant Goodes, Ottawa (CA)

(73) Assignee: Irdeto Canada Corporation, Ottawa (CA)

(*) Notice: Subject to any disclaimer, the term of this patent is extended or adjusted under 35 U.S.C. 154(b) by 94 days.

(21) Appl. No.: 16/835,497

(22) Filed: Mar. 31, 2020

(65) Prior Publication Data

US 2021/0303661 A1 Sep. 30, 2021

(51) Int. Cl.
*G06F 21/14* (2013.01)
*G06F 21/12* (2013.01)

(52) U.S. Cl.
CPC ............ *G06F 21/14* (2013.01); *G06F 21/125* (2013.01); *G06F 2221/0748* (2013.01)

(58) Field of Classification Search
CPC . G06F 21/14; G06F 21/125; G06F 2221/0748
See application file for complete search history.

(56) References Cited

U.S. PATENT DOCUMENTS

| | | | |
|---|---|---|---|
| 6,668,325 B1* | 12/2003 | Collberg | G06F 21/14 713/194 |
| 2006/0195703 A1* | 8/2006 | Jakubowski | G06F 8/51 713/190 |
| 2006/0253687 A1* | 11/2006 | Jakubowski | G06F 21/14 712/210 |
| 2010/0180346 A1* | 7/2010 | Nicolson | G06F 21/14 726/26 |
| 2013/0232323 A1* | 9/2013 | Lerouge | G06F 21/14 712/233 |

* cited by examiner

*Primary Examiner* — Hee K Song
(74) *Attorney, Agent, or Firm* — Rimon PC; Marc Kaufman

(57) ABSTRACT

Systems, methods, and storage media for rendering target code are disclosed. Exemplary implementations may: receive the input code; apply at least one obfuscation transformation to multiple code functions of the input code to create transformed code including transformed code functions; determine a shared constant; determine a function-expression; and replace, for each transformed code function in the transformed code, the transformation parameters with the function expression and the at least one cloaked constant to create target code in which the transformed code functions are entangled to thereby render the target code protected against static analysis attacks.

25 Claims, 2 Drawing Sheets

SYSTEMS, METHODS, AND STORAGE MEDIA FOR CREATING SECURED COMPUTER CODE HAVING ENTANGLED TRANSFORMATIONS

FIELD OF THE DISCLOSURE

The present disclosure relates to systems, methods, and storage media for creating secured computer code.

BACKGROUND

"Obfuscation" is a method of, among other things, applying transformations (also known as "transforms") to computer software code to render the code more complicated (without substantially adversely affecting the intended function) by complicating the reverse engineering of the software code and thus rendering the code more resistant to attack. In many instances delaying the ability of an attacker to reverse engineer software code is sufficient, especially if the code is an application that executes a financial transaction, which usually only take a few seconds to be accomplished. In the instance of copyrighted materials, obfuscation succeeds by making the tampering process difficult enough that the tampering process becomes prohibitively expensive when compared to the cost of a genuine copy of the software.

There are many types of known transformations. Data transformations can be applied (manually or automatically) to the locations of global and local variables, function parameters and returns. Normally intrinsic constants are selected randomly and locally for each individual transform-location set. Function transforms such as UniformSignature (FST) and MergeFunction, can be also be applied manually or automatically and can shuffle function parameters and returns into an array which is used as the new argument to be passed into the transformed functions, and then merge the transformed functions if required.

Transcoder indirection function transformations are applied to function calls automatically and create a function address table which is used to replace all the original function calls. The table includes the function addresses and some intrinsic constants (one for each function address) which are generated randomly to obfuscate the function. Control flow flattening transformations convert control flow into switch statements automatically where intrinsic constants are generated randomly for the statements to thereby obfuscate the control flow of the software.

Conventionally, all transformations are applied individually and generate artifacts, such as pairs of values. These artifacts are referred to as "transformation values" herein and can often be discovered with a "static attack" which involves analyzing the software statically without running it, for instance using a partial evaluator. Once the offsets are discovered, the attacker can often reverse each individual transformation one by one to tamper with the code.

SUMMARY

The mapping between the transformation values and the real function addresses which are being obscured is critical. If an attacker determines the mapping, the attacker can obtain the real function addresses with static analysis. The mapping between the transformation values and the real function parameters and returns which are being obscured is critical. If an attacker determines the mapping, the attacker can obtain the real function parameters and returns with static analysis. Implementations disclosed herein introduce at least one shared constant and at least one "function-expression" into the obscured code. The function expression is code that appears to be a program function but, as described in detail below, serves as an entanglement between different transformations of the obscured code. The function-expression is used to calculate "entangled parameters", constants for example, to increase the difficulty of the static analysis as discussed below.

One aspect of the present disclosure relates to a system configured for rendering protected target code. The system may include one or more hardware processors configured by machine-readable instructions. The processor(s) may be configured to receive the input code. The processor(s) may be configured to apply at least one obfuscation transformation to multiple code functions of the input code to create transformed code including transformed code functions. The transformed code functions may include offsets resulting from the at least one obfuscation transformation. The transformed code, when compiled and executed, may have substantially the same functionality as the input code when compiled and executed. The processor(s) may be configured to receive a shared constant. The processor(s) may be configured to receive a function-expression. The function-expression may be code and accepts the shared constant and at least one offset as arguments to thereby determine at least one transformation parameter or transformation return. The processor(s) may be configured to replace, for each transformed code function in the transformed code, the offsets with the function expression and the at least one transformation parameter to create target code in which the transformed code functions are entangled to thereby render the target code protected against static analysis attacks.

Another aspect of the present disclosure relates to a method for rendering target code. The method may include receiving the input code. The method may include applying at least one obfuscation transformation to multiple code functions of the input code to create transformed code including transformed code functions. The transformed code functions may include at least one offset resulting from the at least one obfuscation transformation. The transformed code, when compiled and executed, may have substantially the same functionality as the input code when compiled and executed. The method may include receiving a shared constant. The method may include receiving a function-expression. The function-expression may be code and accepts the shared constant and the at least one offset as arguments to thereby determine at least one transformation parameter. The method may include replacing, for each transformed code function in the transformed code, the offset with the function expression and the at least one transformation parameter to create target code in which the transformed code functions are entangled to thereby render the target code protected against static analysis attacks.

Yet another aspect of the present disclosure relates to a non-transient computer-readable storage medium having instructions embodied thereon, the instructions being executable by one or more processors to perform a method for rendering target code. The method may include receiving the input code. The method may include applying at least one obfuscation transformation to multiple code functions of the input code to create transformed code including transformed code functions. The transformed code functions may include at least one offset resulting from the at least one obfuscation transformation. The transformed code, when compiled and executed, may have substantially the same functionality as the input code when compiled and executed.

in which the transformed code functions are entangled to thereby render the target code protected against static analysis attacks.

The system apparatus and media can also receive the transformed code from another system and perform the steps of receiving a shared constant, receiving the function-expression and replacing, for each transformed code function in the transformed code, the at least one offset with the function expression and the at least one transformation parameter to create target code.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

As noted above, in conventional obfuscation implementations, individual transforms are applied to discrete portions of the code. Therefore, once an individual transform-location is reverse-engineered, its protections can be removed without affecting any other transform-locations since they are independent of each other. The disclosed implementations provide transformation "entanglements" that result in a security advantage such that, if an individual transform-location is changed, all other entangled locations will be affected, resulting in a situation that the program will not work.

Transformation entanglements can be introduced for all or some transformation features in transformed code. For example, entanglements can be introduced in to Uniform-Signature (FST) and transcoder indirection function (TIF) transforms. In FST transformations, an array is generated to hold some parameter addresses and returns, which is passed to the function whose signatures have been uniformed. The disclosed implementations introduce a new mechanism such that array parameter shuffling is based on both random numbers and new introduced constant shared entanglement parameters (referred to as "shared constants" herein).

In TIF transformations, an array is generated to hold function addresses. The offsets used in the array are generated randomly and are used in the function call for determining the function addresses. The disclosed implementations introduce a new mechanism such that those offsets are generated from both random numbers and the shared constants. The shared constants can be used to calculate the offsets through function-expression code pieces inserted into the code.

By using shared constants several different transform-locations (even of different transform types, e.g. FST and CFF) can "share" the same shared constants, and thus entangle all affected transformation locations. In this way, attacking a single transform-location would end up affecting many other transform-locations thereby achieving increased security of the resulting target code. This feature can be applied automatically (with a percentage of transform-locations using the shared constant model) or under user direction. The global shared constants can be generated randomly or be specified by users. For example, users could specify/provide some constants (either hex or string) which are used for initializing the shared constants. Such shared constants cannot be changed and thus can be detected and used as a signature of the code.

Figure 1:
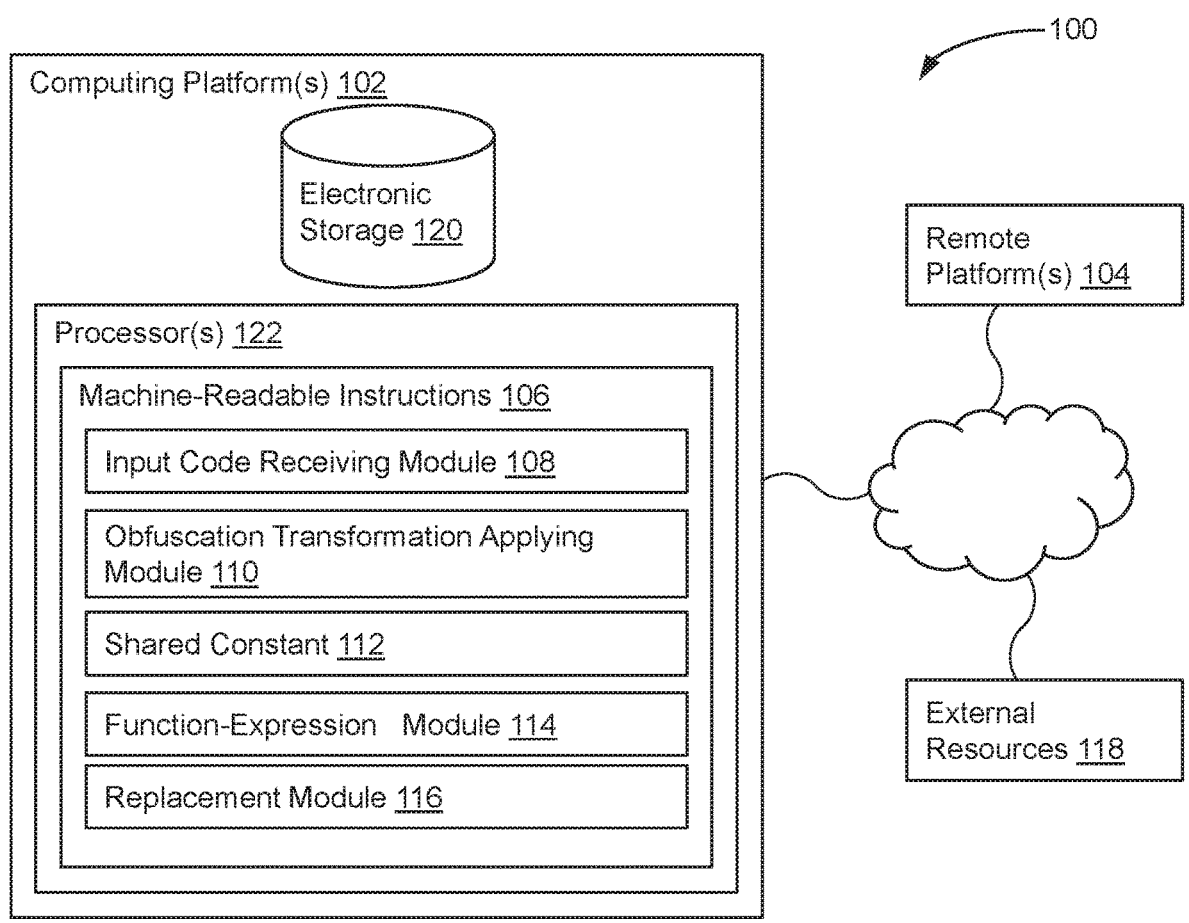
FIG. 1 illustrates a system configured for creating target code with entangled transformations, in accordance with one or more implementations.

FIG. 1 illustrates a system 100 configured for creating target code from input code, in accordance with one or more implementations. In some implementations, system 100 may include one or more computing platforms 102, such as a server. Computing platform(s) 102 may be configured to communicate with one or more remote computing platforms 104, such as client device, according to a client/server architecture and/or other architectures. remote computing platform(s) 104 may be configured to communicate with other computing platforms via computing platforms(s) 102 and/or according to a peer-to-peer architecture and/or other architectures. Users may access system 100 via remote computing platform(s) 104. External resources 118 can be any type of platform, such as remote database, that provides code and/or data to computing platform(s) 102 and/or remote platform(s) 104. For example, input code and/or transformed code can be retrieved from one or more external resources 118.

Computing platform(s) 102 may be configured by machine-readable instructions 106. Machine-readable instructions 106 may include one or more instruction modules. The instruction modules may include computer program modules. The instruction modules may include one or more of input code receiving module 108, obfuscation transformation applying module 110, shared constant module 112, function-expression module 114, replacement module 116, and/or other instruction modules.

Input code receiving module 108 may be configured to receive the input code. The input code can be a generally unsecured/unprotected software program and various functional statements, i.e. code functions, therein. However, the input code can have obfuscations incorporated therein.

Obfuscation transformation applying module 110 may be configured to apply at least one obfuscation transformation to multiple code functions of the input code to create transformed code including transformed code functions. The at least one obfuscation transformation may include at least two different types of obfuscation transformations. The transformed code functions may include transformation values resulting from the at least one obfuscation transformation. The at least one obfuscation transformation may include a transcoder indirect function transformation and the transformation parameters may include offset values. The at least one obfuscation transformation may include a UniformSignature transformation and the transformation parameters include an array of values.

The transformed code, when compiled and executed, may have substantially the same functionality as the input code when compiled and executed. Shared constant module 112 may be configured to determine a shared constant. Function-expression module 114 may be configured to determine a function-expression. The function-expression may be code and accepts the shared constant and at least one transformation value as arguments to thereby determine at least one entangled parameter.

The replacement module 116 may be configured to replace, for each transformed code function in the transformed code, the transformation values with the function expression and the at least one entangled parameter to create target code in which the transformed code functions are entangled to thereby render the target code protected against static analysis attacks.

In some implementations, determining a shared constant may include determining multiple shared constants and the determining a function expression includes determining multiple function-expressions each corresponding to a shared constant and each function-expression and corresponding shared constant are applied to at least two transformed code functions.

In some implementations, computing platform(s) 102, remote platform(s) 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 118 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 118, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information outside of system 100, external entities participating with system 100, and/or other resources. In some implementations, some or all of the functionality attributed herein to external resources 118 may be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute modules 108, 110, 112, 114, and/or 116, and/or other modules. Processor(s) 122 may be configured to execute modules 108, 110, 112, 114, and/or 116, and/or other modules by software; hardware; firmware; some combination of software, hardware, and/or firmware; and/or other mechanisms for configuring processing capabilities on processor(s) 122. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, and/or 116 are illustrated in FIG. 1 as being implemented within a single processing unit, in implementations in which processor(s) 122 includes multiple processing units, one or more of modules 108, 110, 112, 114, and/or 116 may be implemented remotely from the other modules. The description of the functionality provided by the different modules 108, 110, 112, 114, and/or 116 described below is for illustrative purposes, and is not intended to be limiting, as any of modules 108, 110, 112, 114, and/or 116 may provide more or less functionality than is described. For example, one or more of modules 108, 110, 112, 114, and/or 116 may be eliminated, and some or all of its functionality may be provided by other ones of modules 108, 110, 112, 114, and/or 116. As another example, processor(s) 122 may be configured to execute one or more additional modules that may perform some or all of the functionality attributed below to one of modules 108, 110, 112, 114, and/or 116.

Figure 2:
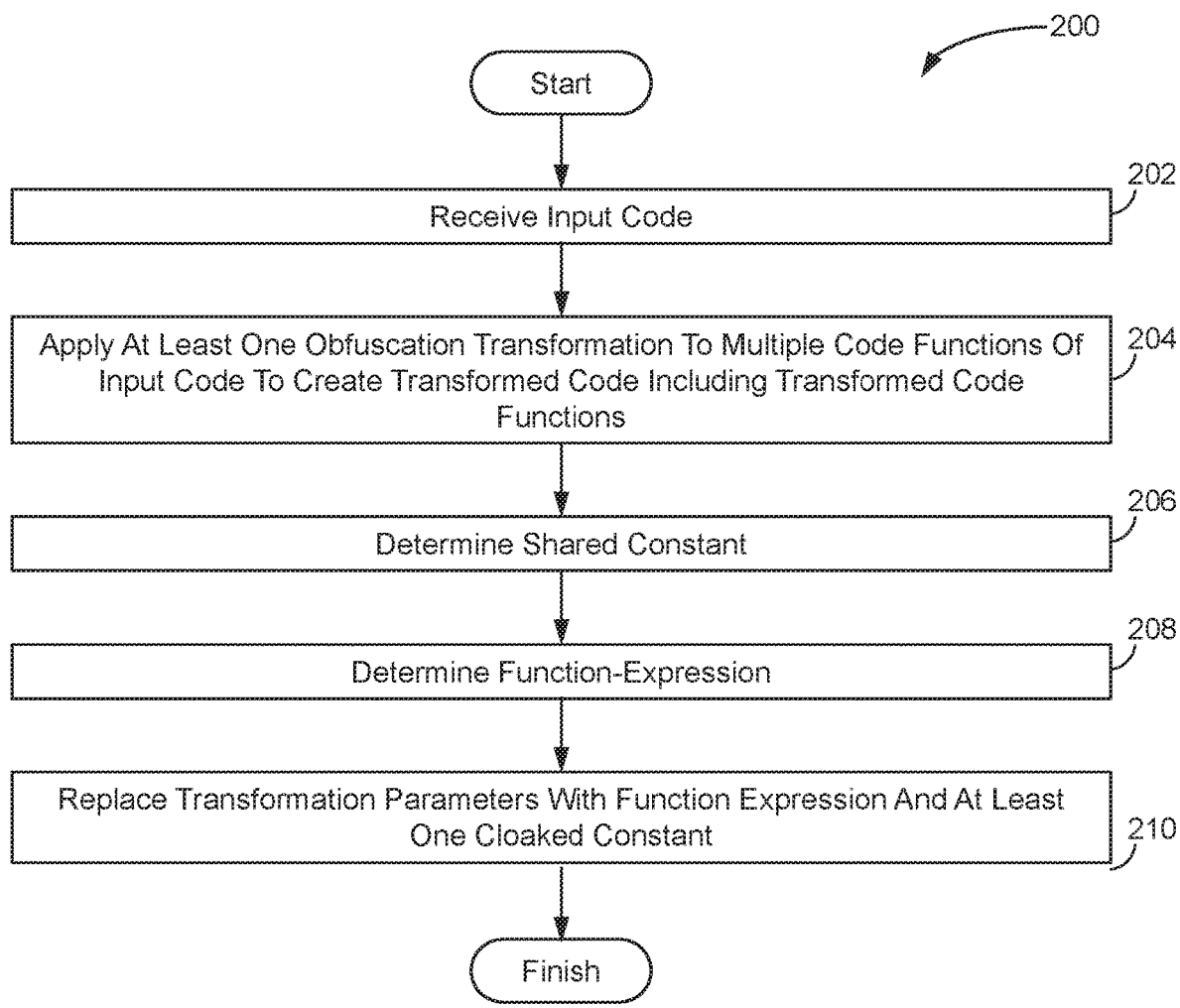
FIG. 2 illustrates a method for creating target code with entangled transformations, in accordance with one or more implementations.

FIG. 2 illustrates a method 200 for rendering target code, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200. For example, method 200 may be implemented by system 100 of FIG. 1.

An operation 202 may include receiving the input code. Operation 202 may be performed by one or more hardware processors configured by machine-readable instructions including a module that is the same as or similar to input code receiving module 108, in accordance with one or more implementations.

An operation 204 may include applying at least one obfuscation transformation to multiple code functions of the input code to create transformed code including transformed code functions. The transformed code functions may include transformation values resulting from the at least one obfuscation transformation. The transformed code, when compiled and executed, may have substantially the same functionality as the input code when compiled and executed. Operation 204 may be performed by one or more hardware processors configured by machine-readable instructions including a module that is the same as or similar to obfuscation transformation applying module 110, in accordance with one or more implementations.

An operation 206 may include determining a shared constant. Operation 206 may be performed by one or more hardware processors configured by machine-readable instructions including a module that is the same as or similar to shared constant module 112, in accordance with one or more implementations.

An operation 208 may include determining a function-expression. The function-expression may be code and accepts the shared constant and at least transformation value as arguments to thereby determine at least one entangled parameter. Operation 208 may be performed by one or more hardware processors configured by machine-readable instructions including a module that is the same as or similar to function-expression module 114, in accordance with one or more implementations.

An operation 210 may include replacing, for each transformed code function in the transformed code, the transformation parameters and/or returns with the function expression and the at least one entangled parameter to create target code in which the transformed code functions are entangled to thereby render the target code protected against static analysis attacks. Operation 210 may be performed by one or more hardware processors configured by machine-readable instructions including a module that is the same as or similar to transformation parameter determination module 116, in accordance with one or more implementations.

As an example, a transcoder can introduce obfuscation features into input code, such as a UniformSignature transform and transcoder indirection function transform, in a known manner to create transformed code. As is well known the fundamental secrets of all obfuscation features are stored in the constants in the transformed, code. As disclosed above, the disclosed implementations introduce one or more shared constants, such as integers into injected code pieces which are used to build data and code entanglements among existing transcoder features. In the following examples, one constant integer (as a shared constant) and one function-expression are introduced to provide an example of the novel constant sharing for two obfuscation features; UniformSignature transformations and transcoder indirection function transformations.

Assuming the following simple c code test.c where the function bar is called in the function main and the function foo is called in the function bar.

```
int foo(int input1, int input2){return input1+input2+1;}
int bar(int input1, int input2){return foo(input1, input2)−1;}
volatile int global_var1=911;
volatile int global_var2=119;
int main(void) {
   int result=bar(global_var1, global_var2);
   return result−1030;
```

In this example, two types of transformations (UniformSignature and transcoder indirection function) are applied to the code in a conventional manner to produce transformed code test.cloak.c shown below.

```
extern void*my_tif_table[2];
void my_foo_fst(unsigned long*av_O) {
   ((*((av_O+(unsigned)2))))=((unsigned long)((long)
      (((*((int*)(av_O+(unsigned)0))))+((*((int*)(av_O+
      (unsigned)3))))+(int)1)));
}
void my_bar_fst(unsigned long*av_P) {
   int r_1L;
   unsigned long fst_array[8];
   int r_1I=((*((int*)(av_P+(unsigned)8))));
   int r_1J=((*((int*)(av_P+(unsigned)4))));
   unsigned long*r_1K=(unsigned long*)&(fst_array);
   ((*((int*)&((r_1K)[(unsigned)0])))=r_1I;
   ((*((int*)&((r_1K)[(unsigned)3])))=r_1J;
   ((void(*)(unsigned long*))((void*)(((unsigned long)
      ((void**)&(my_tif_table))[(unsigned)0u])−(un-
      signed)1334)))((r_1K));
   r_1 L=((int)((unsigned)(r_1K)[(unsigned)2]));
   ((*((av_P+(unsigned)1))))=((unsigned long)((long)
      (r_1L−(int)1)));
}
int volatile global_var1=(int)911;
int volatile global_var2=(int)119;
int main(void) {
   unsigned long fst_array[9];
   int r_2E=global_var1;
   int r_2F=global_var2;
   unsigned long*r_2G=(unsigned long*)&(fst_array);
   ((*((int*)&((r_2G)[(unsigned)4])))=r_2F;
   ((*((int*)&((r_2G)[(unsigned)8])))=r_2E;
   ((void(*)(unsigned long*))((void*)(((unsigned long)
      ((void**)&(my_tif_table))[(unsigned)1 u])−(un-
      signed)1444)))((r_2G));
   return (((int)((unsigned)(r_2G)[(unsigned)1]))−(int)
      1030);
}
void*my_tif_table[2]={(((void*)(((unsigned long)((void
   (*)(unsigned long*))&(my_foo_fst)))+(unsigned long)
   1334)), ((void*)(((unsigned long)((void(*)(unsigned
   long*))&(my_bar_fst)))+(unsigned long)1444))};
```

The bolded code pieces correspond to the transforms of transcoder indirection function and the italicized code pieces correspond to the transforms of UniformSignature. The following code pieces the code pieces from test.cloak.c are elated to the transcoder indirection function transformations. It is apparent that it is relatively easy for an attacker to figure out the relationship between the definition side and the call side using static techniques. All constants resulting from the transformation (1334 and 1444 below) are explicitly used in both the definition side and the call side as shown in bold.

```
extern void*my_tif_table[2];
void my_bar_fst(unsigned long*av_P) {
    . . .
    ((void(*)(unsigned long*))((void*)(((unsigned long)
        ((void**)&(my_tif_table))[(unsigned)0u])-(un-
        signed)1334)))((r_1K));
    . . .
}
int main(void) {
    . . .
    ((void(*)(unsigned long*))((void*)(((unsigned long)
        ((void**)&(my_tif_table))[(unsigned)1      u])-(un-
        signed)1444)))((r_2G));
    . . .
}
void*my_tif_table[2]={(((void*)(((unsigned long)((void
    (*)(unsigned long*))&(my_foo_fst)))+(unsigned long)
    1334)), ((void*)(((unsigned long)((void(*)(unsigned
    long*))&(my_bar_fst)))+(unsigned long)1444))};
```

As noted above, if an attacker determines the mapping, the attacker can obtain the real function addresses with static analysis. Implementations disclosed herein introduce at least one shared constant and at least one "function-expression" into the obscured code. The function expression is code that appears to be a program function but, as described in detail below, serves as an entanglement between different transformations of the obscured code. The function-expression is used to calculate "entangled parameters", constants for example, to increase the difficulty of the static analysis as discussed below. As an example, the shared constant can be a random number or any number selected by the party obscuring the code, such as 433494437. As an example, this constant can be introduced into the code as:

```
int volatile one_constant_for_sharing=433494437;
```

The function expression can be code effecting any expression which processes the shared constant and at least one transformation value as arguments to determine entangled parameters as disclosed below. As an example, the function expression can be introduced as:

```
#define cw_get_index(cw_index, cw_mod) ((cw_index+
    one_constant_for_sharing) % (cw_mod))
```

The constant sharing technique can be applied to make it more difficult for attackers to figure it out the relationships above. Below are new code pieces of target code with the shared constant technique applied to the transcoded indirect function transformed code discussed above using the examples of a shared constant and function expression immediately above.

```
extern void*my_tif_table[2];
void my_bar_fst(unsigned long*av_P) {
    . . .
    ((void(*)(unsigned long*))((void*)(((unsigned long)
        ((void**)&(my_tif_table))[(unsigned)0u])-cw_get_
        index(330, 2019))))((r_1K));
    . . .
}
int main(void) {
    . . .
    ((void(*)(unsigned long*))((void*)(((unsigned long)
        ((void**)&(my_tif_table))[(unsigned)1      u])-
        cw_get_ index(440, 2019)))((r_2G));
    RECOVER OFFSET using new arguments and constant
    . . .
}
void*my_tif_table[2]={(((void*)(((unsigned long)((void
    (*)(unsigned long*))&(my_foo_fst)))+(unsigned long)
    1334)),
    ((void*)(((unsigned long)((void(*)(unsigned long*))&
    (my_bar_fst)))+(unsigned long)1444))};
```

Note that the offsets 1334 and 1444 are generated randomly indirectly: 1334 comes from the calculation of cw_get_index(R1, 2019); and 1444 comes from the calculation of cw_get_index(R2, 2019), where R1 and R2 are two random numbers. In this example, R1 is 330 and R2 is 440. When the Transcoder tools are applied on the input code, the random numbers such as R1 and R2 above are known. The shared constant generated and the function expression used for entanglement is also known. Transcoder tools calculate the offsets (1334 and 1444) based on R1 and R2 using the shared constant and the function expression.

In this example, the constant integer (as a shared constant) is shared in the function-expression which is used in the function call. The clear mapping relationship no longer exists in the resulting protected target code. The process has introduced the call "cw_get_index" (shown in italics above) and new cloaked offsets 330 and 440 (shown in bold above). The call-side/definition side pairs are no longer present. In order for an attack to be successful, an attacker would have to trace the code pieces to calculate constants used in the function call using dynamic techniques. Since the entangled parameters are calculated from the injected code pieces, code pieces could be shuffled using the normal transcoder techniques for increasing code complexity. In the protected target code, the entangled parameters are the result of applying the function expression to the constants in the transformed code and the shared constant. One trivially simple example of applying a function expression is set for the below.

transformation values=10, 12 (offsets in transformed code)
shared constant=3
Function Expression: Cloaked Offset=offset1+offset2+shared constant
Cloaked Offset=10+12+3=25 (Offset in target/cloaked cods)

The example above applied the shared constant to a transcoder indirect function transformation. Below is an example of applying the shared constant to a UniformSignature transformation. The following code pieces are code pieces of test.cloak.c related to UniformSignature transforms. It can be seen that there are two arrays created as a result of the transformations, one for each UniformSignature transform.

```
1. void my_foo_fst(unsigned long*av_O) {
2. ((*((av_O+(unsigned)2))))=
3. ((unsigned long)((long)(((((*((int*)(av_O+(unsigned)
    0))))+
4. ((*((int*)(av_O+(unsigned)3)))))+(int)1)));
5. }
6. void my_bar_fst(unsigned long*av_P) {
7. int r_1L;
8. unsigned long fst_array_1[8];
9. int r1I=((*((int*)(av_P+(unsigned)8))));
11. int r_1J=((*((int*)(av_P+(unsigned)4))));
12. unsigned long*r_1K=(unsigned long*)&(fst_array 1);
```

13. ((*((int*)&((r_1K)[(unsigned)0]))))=r_1 I;
14. ((*((int*)&((r_1K)[(unsigned)3]))))=r_1J;
15. my_foo_fst(r_1K);
16. r_1L=((int)((unsigned)(r_1K)[(unsigned)2]));
17. ((*((av_P+(unsigned)1))))=((unsigned long)((long) (r_1L−(int)1)));
18. }
19. int main(void) {
20. unsigned long fst_array_2[9];
21. unsigned long*r_2G=(unsigned long*)&(fst_array_2);
22. ((*((int*)&((r_2G)[(unsigned)4]))))=r_2F;
23. ((*((int*)&((r_2G)[(unsigned)8]))))=r_2E;
24. my_bar_fst(r_2G);
25. return (((int)((unsigned)(r_2G)[(unsigned)1]))−(int) 1030);
26. }

Taking a look at fst_array_1. The array is generated at line 8 and is big enough to contain all valid parameters, returns and some selected dummies. It is passed into the function at line 15, which has the transform of UniformSignature. At line 13 and line 14, the array is used to store the parameters at the entries of 0 and 3. At line 16, the array is used to retrieve the return from the entry 2. Inside of the function my_foo_fst, the entries of 0 and 3 are used as the original parameters while the return is saved into the entry of 2.

On the call side, the indices of the array must match the indices used in the function to be called as shown in bold at lines 4 and 14, for example. The map allows the transform to hide the relationship of the parameters and returns. However, the map is explicitly exposed in the transformed code, which allows an attacker to ascertain the relationship easily. By applying the constant sharing mechanism disclosed herein, the obfuscation can be increased in target code by changing the call side. Below is the sample code pieces with the constant sharing technique applied.

1. int volatile one_constant_for_sharing=433494437;
2. #define cw_get_new_index(cw_index, cw_mod) ((cw_index+one_constant_for_sharing) % (cw_mod))
3. void my_foo_fst(unsigned long*av_O) {
4. ((*(av_O+(unsigned)cw_get_new_index(2, 8))))= ((unsigned long)((long)(((*((int*)(av_O+(unsigned) cw_get_new_index(0, 8)))))+((*((int*)(av_O+(unsigned)cw_get_new_index(3, 8))))))+(int)1)));
5. }
6. void my_bar_fst(unsigned long*av_P) {
7. int r_1L;
8. unsigned long fst_array[8];
9. int r1I=((*((int*)(av_P+(unsigned)cw_get_new_index (8, 9))));
10. int r_1J=((*((int*)(av_P+(unsigned)cw_get_new_index(4, 9))));
11. unsigned long*r_1K=(unsigned long*)&(fst_array);
12. ((*((int*)&((r_1K)[(unsigned)5]))))=r_1 I;
13. ((*((int*)&((r_1K)[(unsigned)0]))))=r_1J;
14. my_foo_fst(r_1K);
15. r_1L=((int)((unsigned)(r_1K)[(unsigned)7]));
16. ((*((av_P+(unsigned)cw_get_new_index(1, 9))))= ((unsigned long)((long)(r_1L−(int)1)));
17. }
18. int volatile global_var1=(int)911;
19. int volatile global_var2=(int)119;
20. int main(void) {
21. unsigned long fst_array[9];
22. int r_2E=global_var1;
23. int r_2F=global_var2;
24. unsigned long*r_2G=(unsigned long*)&(fst_array);
25. ((*((int*)&((r_2G)[(unsigned)0]))))=r_2F;
26. ((*((int*)&((r_2G)[(unsigned)4]))))=r_2E;
27. my_bar_fst(r_2G);
28. return (((int)((unsigned)(r_2G)[(unsigned)6]))−(int) 1030);
29. }

Note that the offsets 5, 0 and 7 (at line 12, 13 and 15) are generated randomly indirectly: 5 comes from the calculation of cw_get_index(R1, 8); 0 comes from the calculation of cw_get_index(R2, 8); 7 comes from the calculation of cw_get_index(R3, 8), where R1, R2 and R3 are three random numbers which are in the range of [0, 8] and they are not same. In this example, R1 is 0, R2 is 3 and R3 is 2

When our Transcoder tools are applied on the input code, we already know the random numbers such as R1, R2, and R3 above. We also know the shared constant generated and the function expression used for entanglement. Transcoder tools calculate the offsets (5, 0, and 7) based on R1, R2 and R3 using the shared constant and the function expression. As can be seen from the above target code pieces, it is much harder for an attacker to figure out the map relationship from the code by static analysis since the map is calculated at runtime. Specifically, the italicized code is one map for one UniformSignature and the bold code is another map for another UniformSignature. It can be seen that application of the constant sharing mechanism to transformed code yields target code that is much more difficult to attack using static analysis techniques. Accordingly, any computing device configured to execute the target code operates more securely.

As presented in the sections above, the mechanism of constant sharing could be used to increase obfuscation on Transcoder features. All Transcoder features are applied to code pieces individually. The constant sharing mechanism can be used to entangle transformation of different types with one another. In the examples above, the shared constant is the same for both UniformSignature and transcoder indirection functions. The constant for the two features can, of course, be used at the same time as shown in the sample code below.

0. extern void*my_tif_table[2];
1. int volatile one_constant_for_sharing=433494437;
2. #define cw_get_new_index(cw_index, cw_mod) ((cw_index+one_constant_for_sharing) % (cw_mod))
3. void my_foo_fst(unsigned long*av_O) {
4. ((*(av_O+(unsigned)cw_get_new_index(2, 8))))= ((unsigned long)((long)(((*((int*)(av_O+(unsigned) cw_get_new_index(0, 8)))))+((*((int*)(av_O+(unsigned)cw_get_new_index(3, 8))))))+(int)1)));
5. }
6. void my_bar_fst(unsigned long*av_P) {
7. int r_1L;
8. unsigned long fst_array[8];
9. int r_1I=((*((int*)(av_P+(unsigned)cw_get_new_index(8, 9))));
10. int r_1J=((*((int*)(av_P+(unsigned)cw_get_new_index(4, 9))));
11. unsigned long*r_1K=(unsigned long*)&(fst_array);
12. ((*((int*)&((r_1K)[(unsigned)5]))))=r_1 I;
13. ((*((int*)&((r_1K)[(unsigned)0]))))=r_1J;
14. ((void(*)(unsigned long*))((void*)(((unsigned long) ((void**)&(my_tif_table))[(unsigned)0u])−cw_get_ new_index(330, 2019))))((r_1K));
15. r1 L=((int)((unsigned)(r_1K)[(unsigned)7]));
16. ((*((av_P+(unsigned)cw_get_new_index(1, 9))))= ((unsigned long)((long)(r_1L−(int)1)));
17. }
18. int volatile global_var1=(int)911;

19. int volatile global_var2=(int)119;
20. int main(void) {
21. unsigned long fst_array[9];
22. int r_2E=global_var1;
23. int r_2F=global_var2;
24. unsigned long*r_2G=(unsigned long*)&(fst_array);
25. ((*((int*)&((r_2G)[(unsigned)0])))=r_2F;
26. ((*((int*)&((r_2G)[(unsigned)4])))=r_2E;
27. ((void(*)(unsigned long*))((void*)(((unsigned long)((void**)&(my_tif_table))[(unsigned)1u])−cw_get_new_index(440, 2019))))((r_2G));
28. return (((int)((unsigned)(r_2G)[(unsigned)6]))−(int)1030);
29. }
30. void*my_tif_table[2]={(((void*)(((unsigned long)((void(*)(unsigned long*))&(my_foo_fst)))+(unsigned long)1334)), ((void*)(((unsigned long)((void(*)(unsigned long*))&(my_bar_fst)))+(unsigned long)1444))};

Two Transcoder features are entangled with the constant sharing mechanism in the target code above. Note that some transcoder features are designed to be applied to per compilation unit. With the constant sharing mechanism above, such a per compilation unit transcoder features are entangled across compilation units.

Any number of shared constants can be used as appropriate for the application. For example, if there are 10 transformation functions in original 2 shared constants and 2 function expressions can be introduced to entangle the transforms applied to those 10 functions. The sharing of constants in the manner described herein propagates the attacker code modifications to other places in the code. If hacker changes a constant in one part of code, other parts will be affected, and the code will not execute.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for rendering target code, the system comprising:
   one or more hardware processors configured by machine-readable instructions to:
      receive the input code;
      apply at least one obfuscation transformation to multiple code functions of the input code to create transformed code including transformed code functions, the transformed code functions including at least one transformation value resulting from the at least one obfuscation transformation, wherein the transformed code, when compiled and executed, has substantially the same functionality as the input code when compiled and executed;
      receive a shared constant;
      receive a function-expression, wherein the function-expression is code and accepts the shared constant and the at least transformation value as arguments to thereby determine at least one entangled parameter;
      replace, for each transformed code function in the transformed code, the at least one transformation value with the function expression and the at least one entangled parameter to create target code in which the transformed code functions are entangled to thereby render the target code protected against static analysis attacks.

2. The system of claim 1, wherein the at least one obfuscation transformation includes a transcoder indirect function transformation and the transformation values include offset values.

3. The system of claim 1, wherein the at least one obfuscation transformation includes a UniformSignature transformation and the transformation values include an array of values.

4. The system of claim 1, wherein determining a shared constant comprises determining multiple share constants and the determining a function expression comprises determining multiple function-expressions each corresponding to a shared constant and each function-expression and corresponding shared constant are applied to at least two transformed code functions.

5. The system of claim 1, wherein the at least one obfuscation transformation comprises at least two different types of obfuscation transformations.

6. A method for rendering target code, comprising:
   receiving the input code;
   applying at least one obfuscation transformation to multiple code functions of the input code to create transformed code including transformed code functions, the transformed code functions including transformation values resulting from the at least one obfuscation transformation, wherein the transformed code, when compiled and executed, has substantially the same functionality as the input code when compiled and executed;
   determining a shared constant;
   determining a function-expression, wherein the function-expression is code and accepts the shared constant and the at least one transformation value as arguments to thereby determine at least one entangled parameter;
   replacing, for each transformed code function in the transformed code, the transformation values with the function expression and the at least one entangled parameter to create target code in which the transformed code functions are entangled to thereby render the target code protected against static analysis attacks.

7. The method of claim 6, wherein the at least one obfuscation transformation includes a transcoder indirect function transformation and the transformation values include offset values.

8. The method of claim 6, wherein the at least one obfuscation transformation includes a UniformSignature transformation and the transformation values include an array of values.

9. The method of claim 6, wherein determining a shared constant comprises determining multiple share constants and the determining a function expression comprises determining multiple function-expressions each corresponding to a shared constant and each function-expression and corresponding shared constant are applied to at least two transformed code functions.

10. The method of claim 6, wherein the at least one obfuscation transformation comprises at least two different types of obfuscation transformations.

11. A non-transient computer-readable storage medium having instructions embodied thereon, the instructions being executable by one or more processors to perform a method for rendering target code, the method comprising:
- receiving the input code;
- applying at least one obfuscation transformation to multiple code functions of the input code to create transformed code including transformed code functions, the transformed code functions including transformation values resulting from the at least one obfuscation transformation, wherein the transformed code, when compiled and executed, has substantially the same functionality as the input code when compiled and executed;
- determining a shared constant;
- determining a function-expression, wherein the function-expression is code and accepts the shared constant and at least one transformation value as arguments to thereby determine at least one entangled parameter;
- replacing, for each transformed code function in the transformed code, the transformation parameters with the function expression and the at least one entangled parameter to create target code in which the transformed code functions are entangled to thereby render the target code protected against static analysis attacks.

12. The computer-readable storage medium of claim 11, wherein the at least one obfuscation transformation includes a transcoder indirect function transformation and the transformation values include offset values.

13. The computer-readable storage medium of claim 11, wherein the at least one obfuscation transformation includes a UniformSignature transformation and the transformation values include an array of values.

14. The computer-readable storage medium of claim 11, wherein determining a shared constant comprises determining multiple share constants and the determining a function expression comprises determining multiple function-expressions each corresponding to a shared constant and each function-expression and corresponding shared constant are applied to at least two transformed code functions.

15. The computer-readable storage medium of claim 11, wherein the at least one obfuscation transformation comprises at least two different types of obfuscation transformations.

16. A system configured for rendering target code, the system comprising:
- one or more hardware processors configured by machine-readable instructions to:
  - receive transformed code, the transformed code being created by apply at least one obfuscation transformation to multiple code functions of input code and including transformed code functions, the transformed code functions including at least one transformation value resulting from the at least one obfuscation transformation, wherein the transformed code, when compiled and executed, has substantially the same functionality as the input code when compiled and executed;
  - receive a shared constant;
  - receive a function-expression, wherein the function-expression is code and accepts the shared constant and the at least transformation value as arguments to thereby determine at least one entangled parameter;
  - replace, for each transformed code function in the transformed code, the at least one transformation value with the function expression and the at least one entangled parameter to create target code in which the transformed code functions are entangled to thereby render the target code protected against static analysis attacks.

17. The system of claim 16 wherein the at least one obfuscation transformation includes a transcoder indirect function transformation and the transformation values include offset values.

18. The system of claim 16 wherein the at least one obfuscation transformation includes a UniformSignature transformation and the transformation values include an array of values.

19. The system of claim 16 wherein determining a shared constant comprises determining multiple share constants and the determining a function expression comprises determining multiple function-expressions each corresponding to a shared constant and each function-expression and corresponding shared constant are applied to at least two transformed code functions.

20. The system of claim 16, wherein the at least one obfuscation transformation comprises at least two different types of obfuscation transformations.

21. A method for rendering target code, comprising:
- receiving the input code, the input code being created by applying at least one obfuscation transformation to multiple code functions of the input code and including transformed code functions, the transformed code functions including transformation values resulting from the at least one obfuscation transformation, wherein the transformed code, when compiled and executed, has substantially the same functionality as the input code when compiled and executed;
- determining a shared constant;
- determining a function-expression, wherein the function-expression is code and accepts the shared constant and the at least one transformation value as arguments to thereby determine at least one entangled parameter;
- replacing, for each transformed code function in the transformed code, the transformation values with the function expression and the at least one entangled parameter to create target code in which the transformed code functions are entangled to thereby render the target code protected against static analysis attacks.

22. The method of claim 21, wherein the at least one obfuscation transformation includes a transcoder indirect function transformation and the transformation values include offset values.

23. The method of claim 21, wherein the at least one obfuscation transformation includes a UniformSignature transformation and the transformation values include an array of values.

24. The method of claim 22, wherein determining a shared constant comprises determining multiple share constants and the determining a function expression comprises determining multiple function-expressions each corresponding to a shared constant and each function-expression and corresponding shared constant are applied to at least two transformed code functions.

25. The method of claim 22, wherein the at least one obfuscation transformation comprises at least two different types of obfuscation transformations.

* * * * *